United States Patent
Yasuoka

(10) Patent No.: US 9,132,798 B2
(45) Date of Patent: Sep. 15, 2015

(54) SEAT-MOUNTED AIRBAG APPARATUS AND VEHICLE SEAT

(71) Applicant: Toyota Jidosha Kabushiki Kaisha, Toyota-shi Aichi-ken (JP)

(72) Inventor: Shiro Yasuoka, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/499,610

(22) Filed: Sep. 29, 2014

(65) Prior Publication Data

US 2015/0091278 A1      Apr. 2, 2015

(30) Foreign Application Priority Data

Oct. 1, 2013   (JP) ................. 2013-206571

(51) Int. Cl.
| | |
|---|---|
| *B60R 21/16* | (2006.01) |
| *B60R 21/231* | (2011.01) |
| *B60R 21/207* | (2006.01) |
| *B60R 21/233* | (2006.01) |
| *B60R 21/00* | (2006.01) |

(52) U.S. Cl.
CPC ............ *B60R 21/231* (2013.01); *B60R 21/207* (2013.01); *B60R 21/233* (2013.01); *B60R 2021/0004* (2013.01); *B60R 2021/0006* (2013.01); *B60R 2021/0058* (2013.01); *B60R 2021/23316* (2013.01)

(58) Field of Classification Search
USPC ........................ 280/729, 730.2, 733, 743.2
See application file for complete search history.

(56) References Cited

U.S. PATENT DOCUMENTS

| | | | | | |
|---|---|---|---|---|---|
| 3,981,520 | A | * | 9/1976 | Pulling | 280/730.2 |
| 4,359,200 | A | * | 11/1982 | Brevard et al. | 244/122 AG |
| 5,895,070 | A | * | 4/1999 | Lachat | 280/730.2 |
| 6,059,311 | A | * | 5/2000 | Wipasuramonton et al. | 280/729 |
| 7,665,761 | B1 | * | 2/2010 | Green et al. | 280/733 |
| 8,469,395 | B2 | * | 6/2013 | Richez et al. | 280/730.2 |
| 8,899,619 | B2 | * | 12/2014 | Fukawatase | 280/749 |
| 2005/0189746 | A1 | * | 9/2005 | Loos et al. | 280/730.2 |
| 2005/0236819 | A1 | | 10/2005 | Riedel et al. | |
| 2009/0243268 | A1 | * | 10/2009 | Suzuki et al. | 280/730.2 |
| 2012/0049498 | A1 | | 3/2012 | Wiik et al. | |

(Continued)

FOREIGN PATENT DOCUMENTS

| | | | |
|---|---|---|---|
| JP | 2000142303 | A | 5/2000 |
| JP | 2004-034837 | A | 2/2004 |
| JP | 2005-306377 | A | 11/2005 |

(Continued)

*Primary Examiner* — Toan To
(74) *Attorney, Agent, or Firm* — Gifford, Krass, Sprinkle, Anderson & Citkowski, P.C.

(57) ABSTRACT

A seat-mounted airbag apparatus includes an inflator that is provided in a vehicle seat and generates gas by being activated; a shoulder airbag that is formed in a long bag shape and is housed in one side portion of a seatback of the vehicle seat, with one longitudinal end portion being fixed to a seatback frame, the shoulder airbag inflating and deploying by the gas being supplied there into, and extending from an upper end portion of the side portion toward a vehicle front side; and an expanding member that expands between the inflated and deployed shoulder airbag and the seatback frame, and that opposes one shoulder of a seated occupant from a side, and keeps the other longitudinal end portion of the shoulder airbag in a position opposing the one shoulder from the front.

16 Claims, 19 Drawing Sheets

(56) References Cited

U.S. PATENT DOCUMENTS

2012/0091697 A1  4/2012  Wiik et al.
2014/0300088 A1* 10/2014 Fukawatase ............... 280/729

FOREIGN PATENT DOCUMENTS

| JP | 2012-051557 A | 3/2012 |
| JP | 2012-081958 A | 4/2012 |

* cited by examiner

F I G . 6
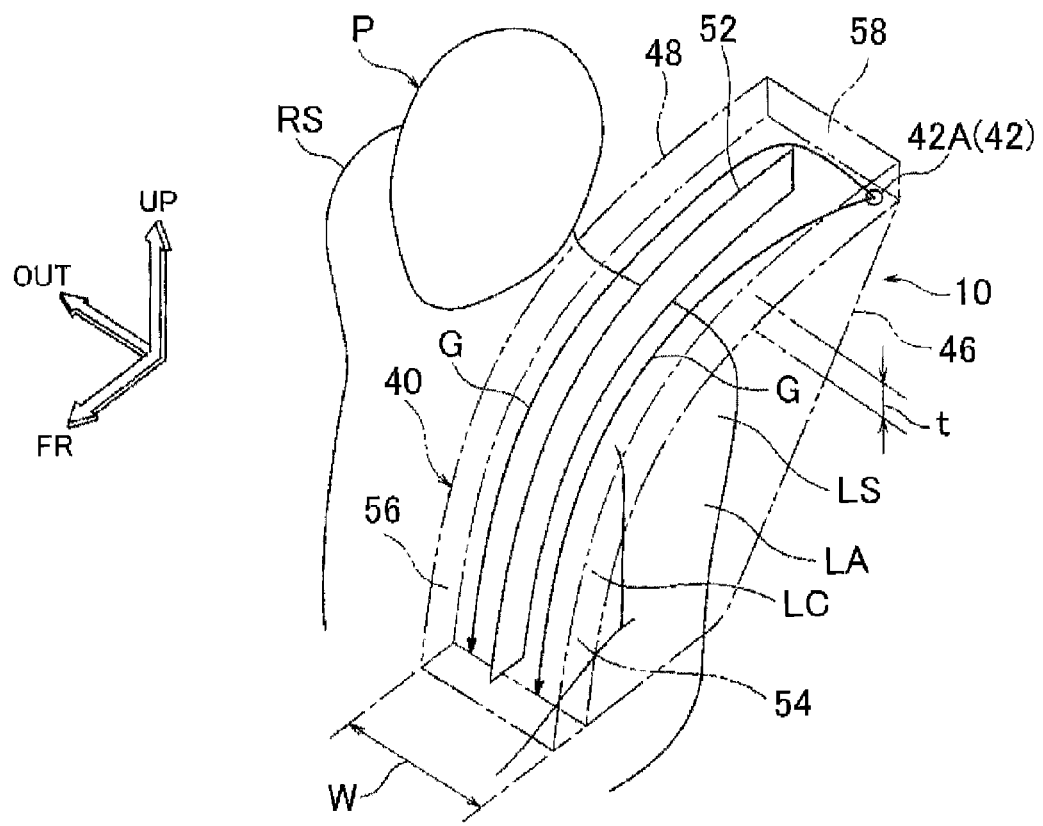

F I G . 9B
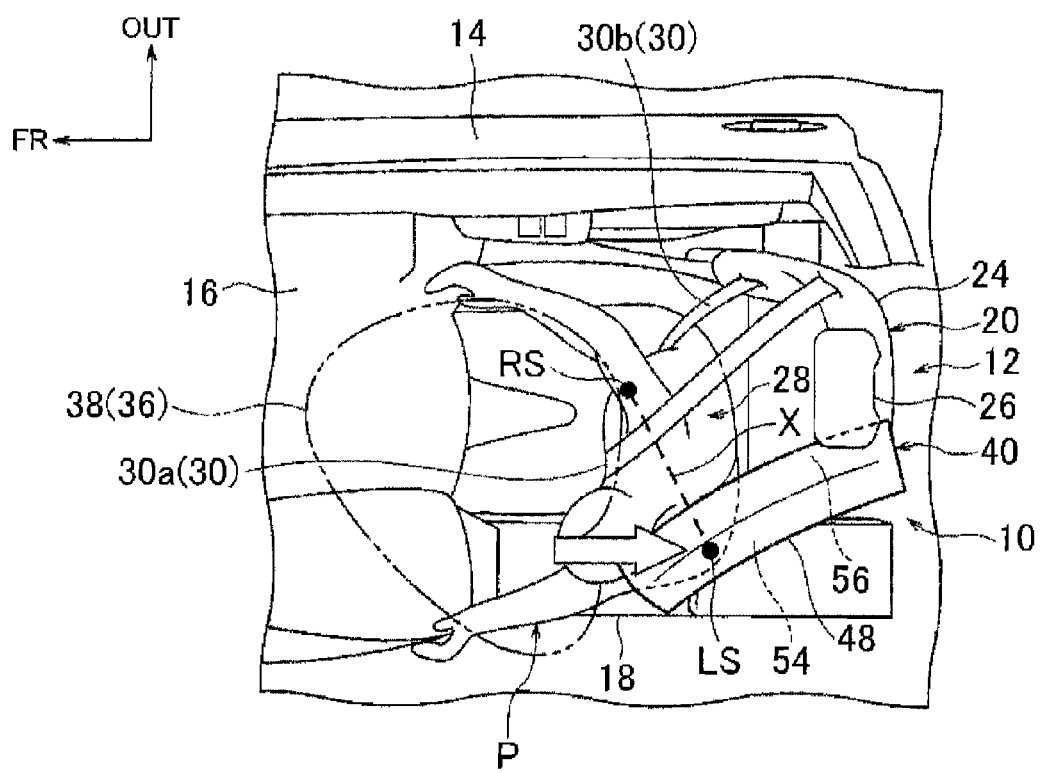

F I G . 10A
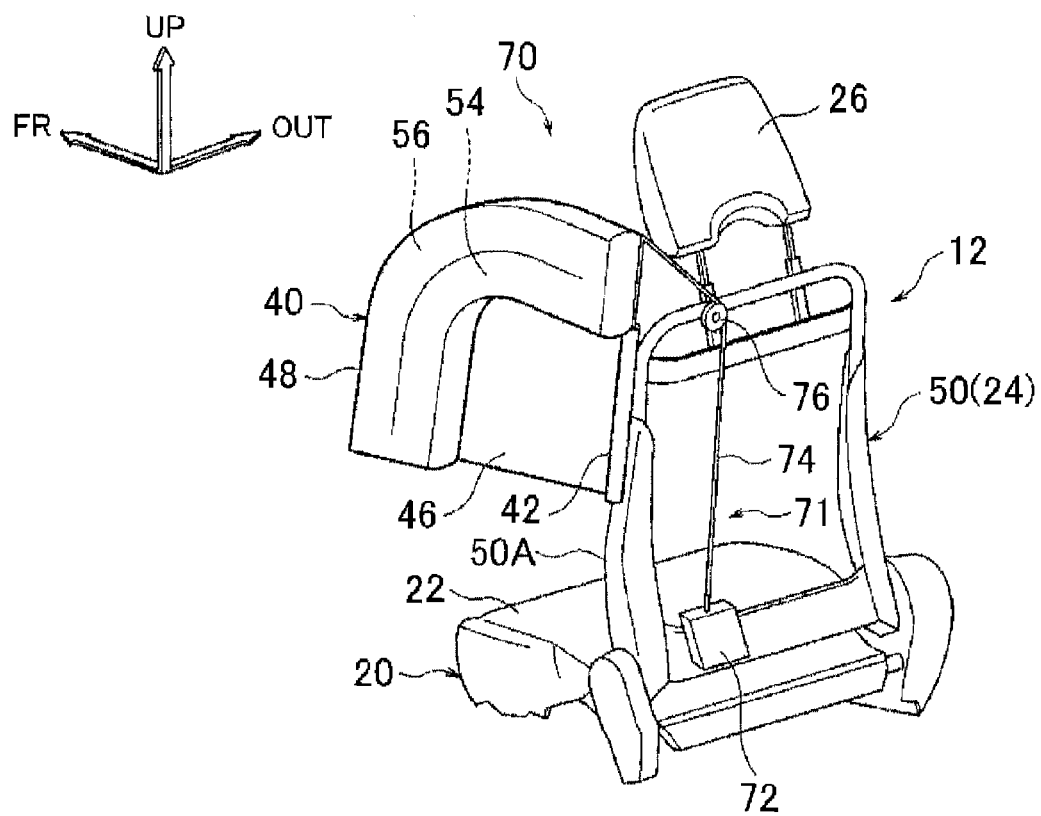

SEAT-MOUNTED AIRBAG APPARATUS AND VEHICLE SEAT

INCORPORATION BY REFERENCE

The disclosure of Japanese Patent Application No. 2013-206571 filed on Oct. 1, 2013 including the specification, drawings and abstract is incorporated herein by reference in its entirety.

BACKGROUND OF THE INVENTION

1. Field of the Invention

The invention relates to a seat-mounted airbag apparatus mounted in a vehicle seat, and a vehicle seat.

2. Description of Related Art

Japanese Patent Application Publication No. 2012-051557 (JP 2012-051557 A) describes an airbag apparatus mounted in a vehicle seat. With this airbag apparatus, an airbag bag body has an inflating portion and at least one non-inflating portion. A tether that is joined to a seatback frame passes through an opening formed in the non-inflating portion and is connected to a front end of the airbag bag body. This tether effectively restrains the occupant by contacting both the airbag bag body and the occupant when the airbag bag body deploys, and controls the deployment trajectory of the airbag body.

With this kind of airbag apparatus, the airbag bag body is configured to deploy next to the occupant, and is thus unable to restrain the occupant from the front. Therefore, there is room for improvement in terms of protecting the occupant when a frontal collision occurs.

SUMMARY OF THE INVENTION

The invention provides a seat-mounted airbag apparatus and vehicle seat capable of restraining a seated occupant from the front.

A first aspect of the invention relates to a seat-mounted airbag apparatus. This seat-mounted airbag apparatus includes an inflator that is provided in a vehicle seat and generates gas by being activated; a shoulder airbag that is formed in a long bag shape and is housed in one side portion of a seatback of the vehicle seat, with one longitudinal end portion being fixed to a seatback frame, the shoulder airbag inflating and deploying by the gas being supplied there into, and extending from an upper end portion of the side portion toward a vehicle front side; and an expanding member that expands between the inflated and deployed shoulder airbag and the seatback frame, and that opposes one shoulder of a seated occupant from a side, and keeps the other longitudinal end portion of the shoulder airbag in a position opposing the one shoulder from the front.

In this aspect, the inflator is activated when the vehicle is involved in a frontal collision, for example. Consequently, gas is supplied into the shoulder airbag that is formed in a long bag shape and is housed in one side portion of the seatback of the vehicle seat, causing the shoulder airbag to inflate and deploy. This shoulder airbag is fixed at one longitudinal end portion to the seatback frame, and extends from an upper end portion of the side portion toward the vehicle front side when inflated and deployed. Further, the expanding member expands between the inflated and deployed shoulder airbag and the seatback frame. This expanding member opposes one shoulder of the seated occupant from the side, and keeps the other longitudinal end portion of the shoulder airbag opposing the one shoulder from the front. As a result, the one shoulder is able to be restrained from both the side and the front.

A second aspect of the invention relates to a seat-mounted airbag apparatus. This seat-mounted airbag apparatus includes an inflator that is provided in a vehicle seat and generates gas by being activated; a shoulder airbag that is formed in a long bag shape and is housed in one side portion of a seatback of the vehicle seat, with one longitudinal end portion being fixed to a seatback frame, the shoulder airbag inflating and deploying by the gas being supplied there into, and extending from an upper end portion of the side portion toward a vehicle front side; an expanding member that expands between the inflated and deployed shoulder airbag and the seatback frame, and that opposes one shoulder of a seated occupant from a side, and that holds the other longitudinal end portion of the shoulder airbag in a state extending toward a vehicle lower side; and a retracting device that causes the other longitudinal end portion to oppose the one shoulder from a front, by pulling down the inflated and deployed shoulder airbag toward a seat width direction inside by driving force.

In this aspect, the inflator is activated when the vehicle is involved in a frontal collision, for example. Consequently, gas is supplied into the shoulder airbag that is formed in a long bag shape and is housed in one side portion of the seatback of the vehicle seat, causing the shoulder airbag to inflate and deploy. This shoulder airbag is fixed at one longitudinal end portion to the seatback frame, and extends front an upper end portion of the side portion toward the vehicle front side when inflated and deployed. Further, the expanding member expands between the inflated and deployed shoulder airbag and the seatback frame. This expanding member opposes one shoulder of the seated occupant from the side, and keeps the other longitudinal end portion of the shoulder airbag extended toward the vehicle lower side. In addition, the other longitudinal end portion of the shoulder airbag is made to oppose the one shoulder from the front by the retracting device pulling down the inflated and deployed shoulder airbag toward the seat width direction inside by driving force. As a result, the one shoulder is able to be restrained from both the side and the front.

Moreover, the inflated and deployed shoulder airbag is made to oppose one shoulder by being pulled down toward the seat width direction inside, so the shoulder airbag is able to be inflated and deployed farther to the seat width direction outside than the one shoulder. Accordingly, it is possible to prevent or effectively inhibit the shoulder airbag from inadvertently interfering with the one shoulder, so the shoulder airbag can inflate and deploy smoothly.

A third aspect of the invention relates to a vehicle seat. This vehicle seat includes a seat main body having a seatback, and the seat-mounted airbag apparatus according to the first aspect provided in the seatback.

In this aspect, the seat-mounted airbag apparatus according to the first aspect is provided in the seatback of the seat main body, so the same operation and effects as those described above are able to be displayed.

As described above, the seat-mounted airbag apparatus according to the first and second aspects of the invention, and the vehicle seat according to the third aspect of the invention, are able to restrain a seated occupant from both the side and the front.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a perspective view illustrating the flow of gas supplied into the shoulder airbag according to the first example embodiment of the invention;

FIG. 9B is a plan view showing a later stage of the collision after the point shown in FIG. 9A, in the vehicle according to the first example embodiment of the invention;

FIG. 10A is a perspective view of the structure of the main portions of a vehicle seat according to a second example embodiment of the invention, showing a shoulder airbag in an inflated and deployed state;

DETAILED DESCRIPTION OF EMBODIMENTS

First Example Embodiment

Figure 1:
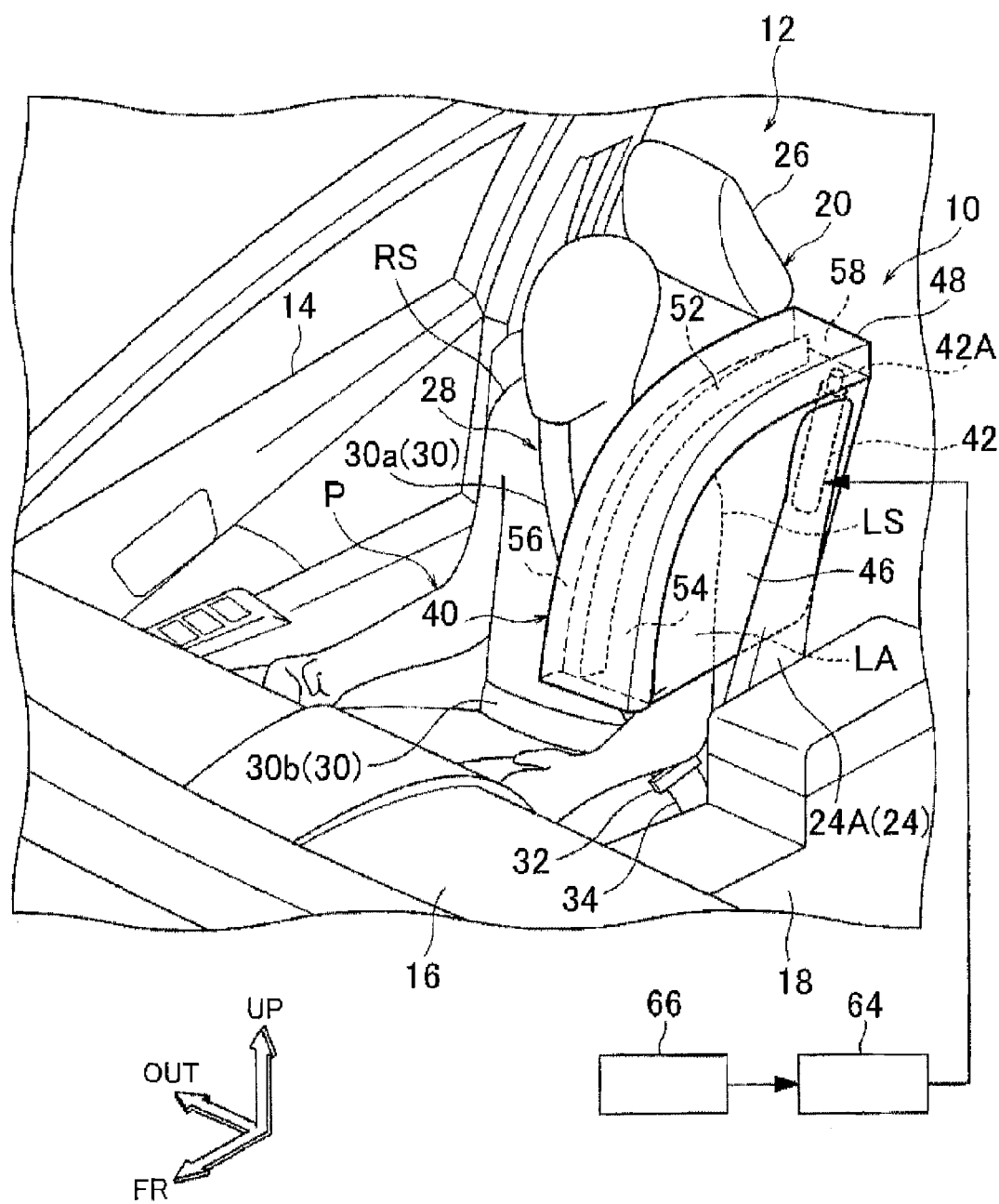
FIG. 1 is a perspective view of the structure of a right side portion of a vehicle cabin front portion of a vehicle provided with a vehicle seat according to a first example embodiment of the invention, showing a shoulder airbag of a seat-mounted airbag apparatus in an inflated and deployed state.
Figure 2:
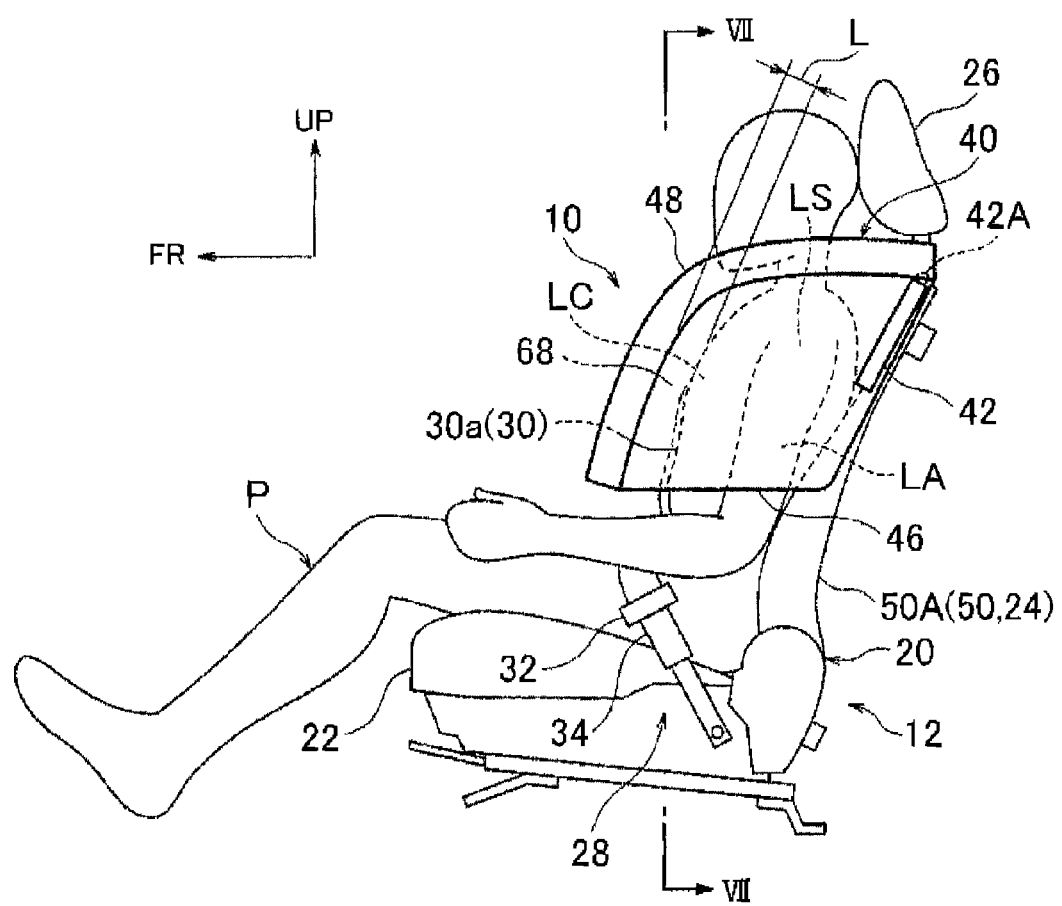
FIG. 2 is a side view of the structure of the main portions of the vehicle seat according to the first example embodiment of the invention, showing the shoulder airbag in an inflated and deployed state.
Figure 3:
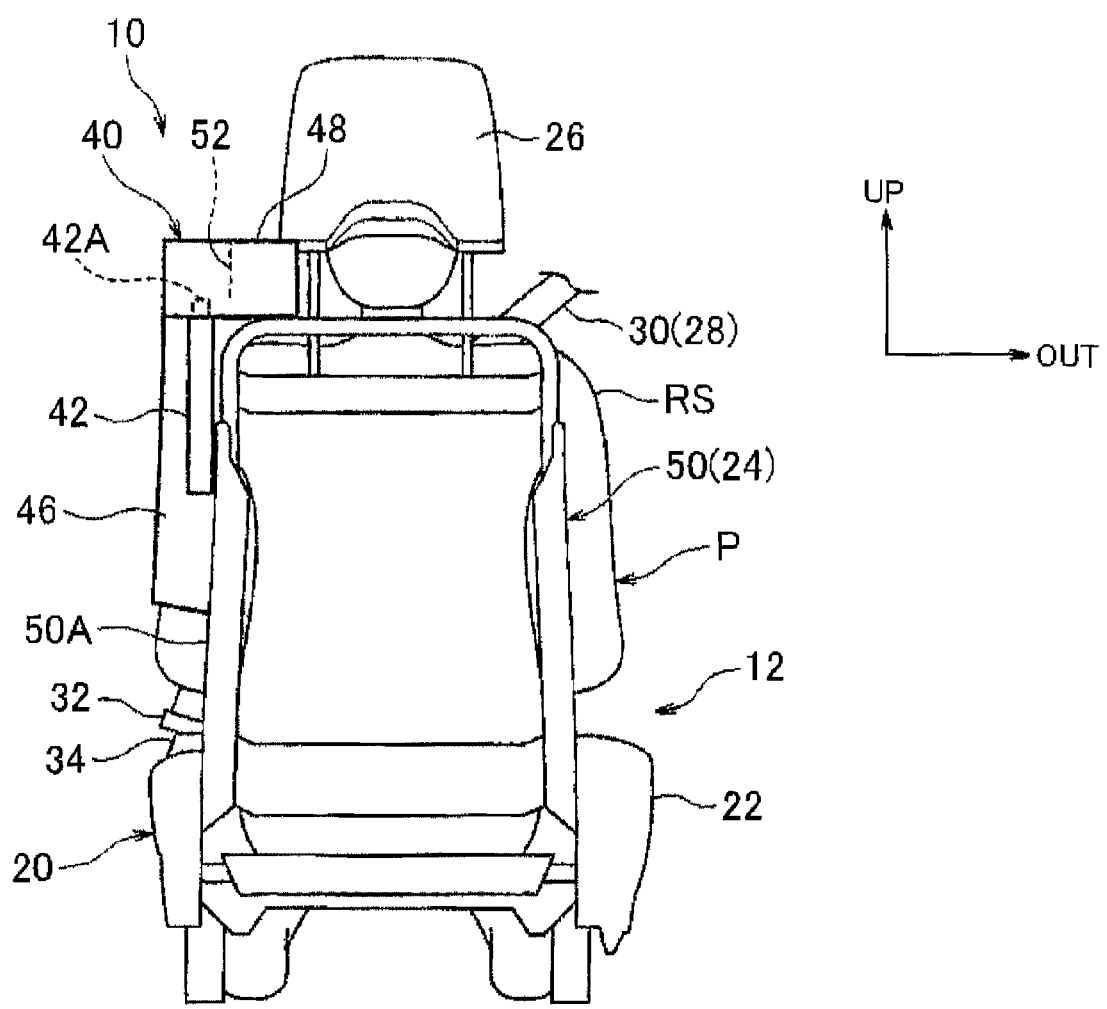
FIG. 3 is a back view of the structure of the main portions of the vehicle seat according to the first example embodiment of the invention, showing the shoulder airbag in an inflated and deployed state.

A seat-mounted airbag apparatus 10 and a vehicle seat 12 according to a first example embodiment of the invention will now be described with reference to FIGS. 1 to 9. In the drawings, arrow FR indicates a forward direction (advancing direction) with respect to a vehicle, arrow UP indicates an upward direction with respect to the vehicle, and arrow OUT indicates an outside in a vehicle width direction. Hereinafter, unless otherwise specific, when directions of front and rear, up and down, and left and right are used, they will refer to front and rear in a vehicle longitudinal direction, left and right in a vehicle left-right direction (i.e., the vehicle width direction), and up and down in a vehicle up-down direction, respectively.

(Structure)

The vehicle seat 12 shown in FIGS. 1 to 4 is a front seat of a vehicle. More specifically, in this case, the vehicle seat 12 is a passenger seat of a left-hand drive vehicle, and is arranged on a right side of a vehicle cabin front portion. In FIG. 1, reference character 14 denotes a side door, reference character 16 denotes an instrument panel, and reference character 18 denotes a center console.

This vehicle seat 12 is formed by a seat main body 20 and the seat-mounted airbag apparatus 10. The seat main body 20 includes a seat cushion 22 that supports the buttocks and thighs of a seated occupant P (hereinafter, simply referred to as "occupant P"), a seatback 24 that supports the back of the occupant P, and a headrest 26 that supports the head of the occupant P. In this example embodiment, the front-rear (longitudinal) direction, the left-right (width) direction, and the up-down (vertical) direction of the seat main body 20 match the front-rear (longitudinal) direction, the left-right (width) direction, and the up-down (vertical) direction of the vehicle. Also, the occupant P shown in FIGS. 1 and 2 and the like is an AM50 (i.e., a model covering 50% of American adult males) dummy, for example.

The occupant P seated in the seat main body 20 is restrained in the seat main body 20 by a three-point seatbelt apparatus 28. This three-point seatbelt apparatus 28 is a typical seatbelt. A seatbelt 30 is strung across the upper body of the occupant P seated in the seat main body 20, and a tongue plate 32 is fastened to a buckle 34. As a result, the occupant P is in a state wearing the seatbelt 30, with the shoulders and chest of the occupant P restrained by a shoulder belt 30a of the seatbelt 30, and the abdominal region and waist restrained by a waist belt 30b of the seatbelt 30. The buckle 34 is provided on the left side (i.e., the vehicle width direction inside; one of the left and right sides) of the seat cushion 22. When the occupant P is wearing the seatbelt 30, a right shoulder RS (the shoulder on the vehicle width direction outside; the outside shoulder) of the occupant P is restrained by the shoulder belt 30a of the seatbelt 30.

Also a front passenger airbag apparatus 36 (see FIGS. 8A and 8B) is provided in an instrument panel 16 in front of the seat main body 20. This front passenger airbag apparatus 36 is configured to inflate and deploy a front passenger airbag 38 (a front passenger airbag) in front of the vehicle seat 12 with gas generated by an inflator, not shown. This front passenger airbag apparatus 36 is also a typical airbag apparatus, so a detailed description thereof will be omitted.

Figure 4:
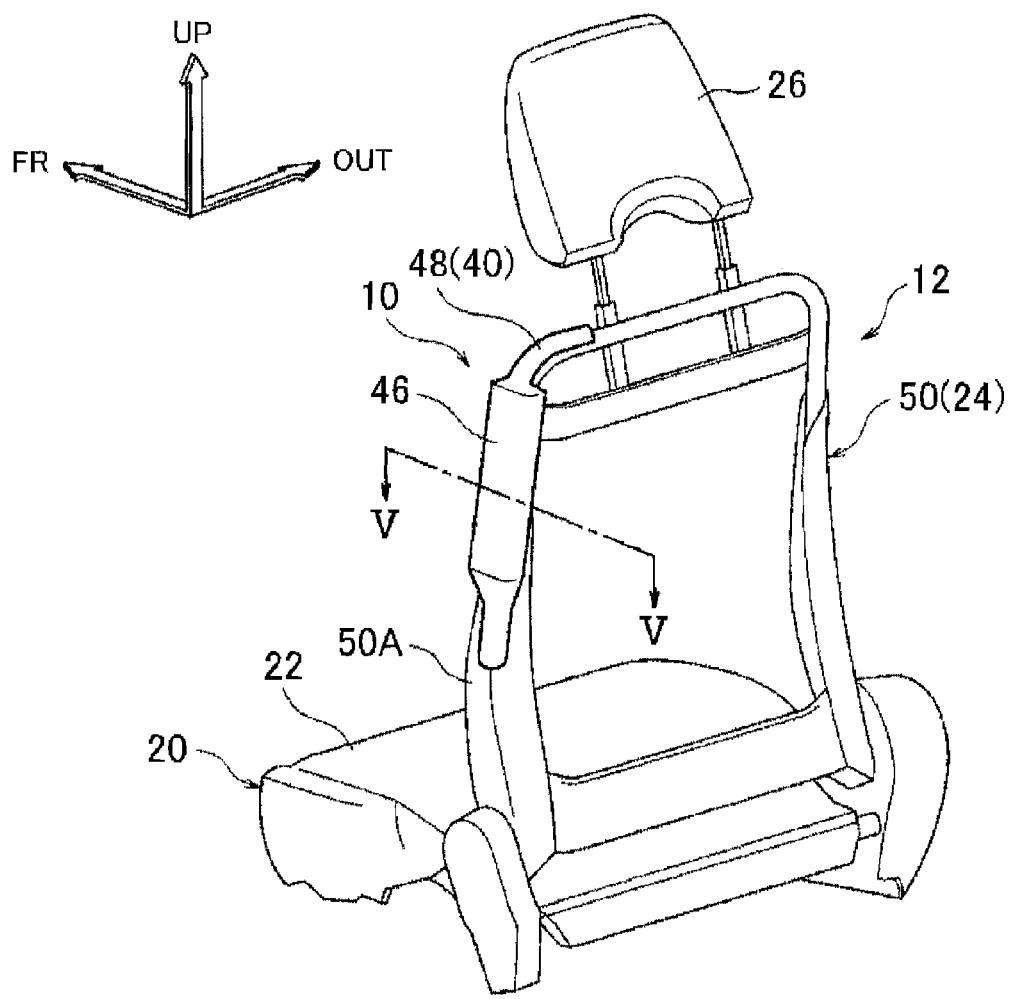
FIG. 4 is a perspective view from the back side of the structure of the main portions of the vehicle seat according to the first example embodiment of the invention, showing the shoulder airbag in a housed state.
Figure 5:
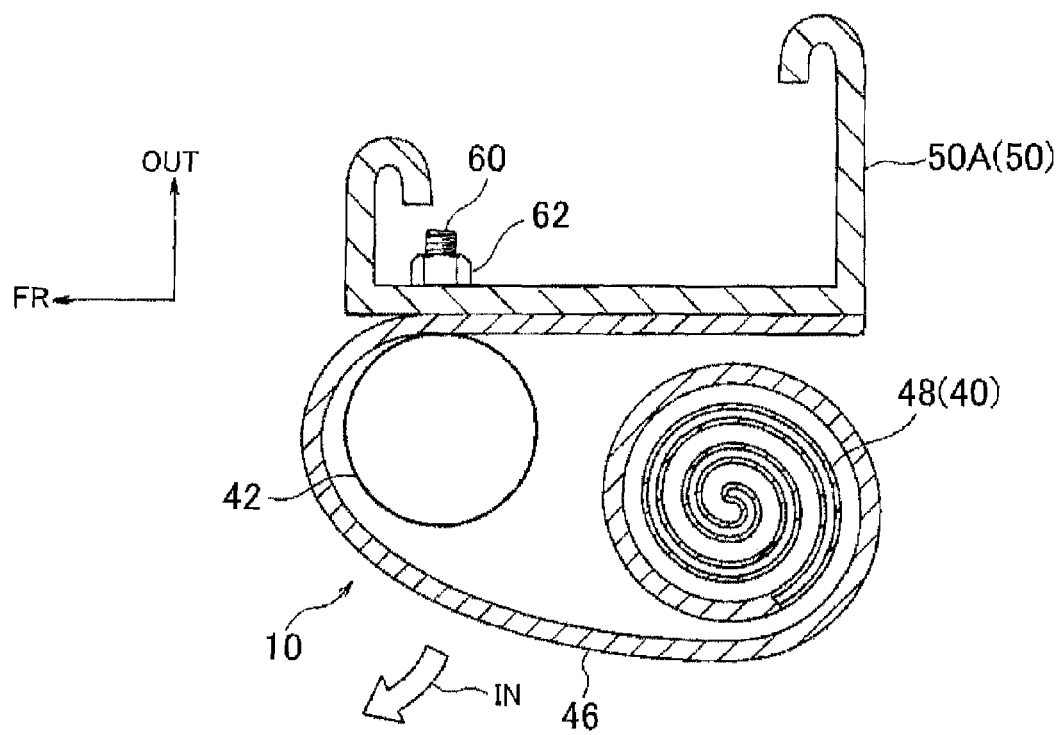
FIG. 5 is an enlarged sectional view of a cross-section taken along line V-V in FIG. 4.
Figure 7:
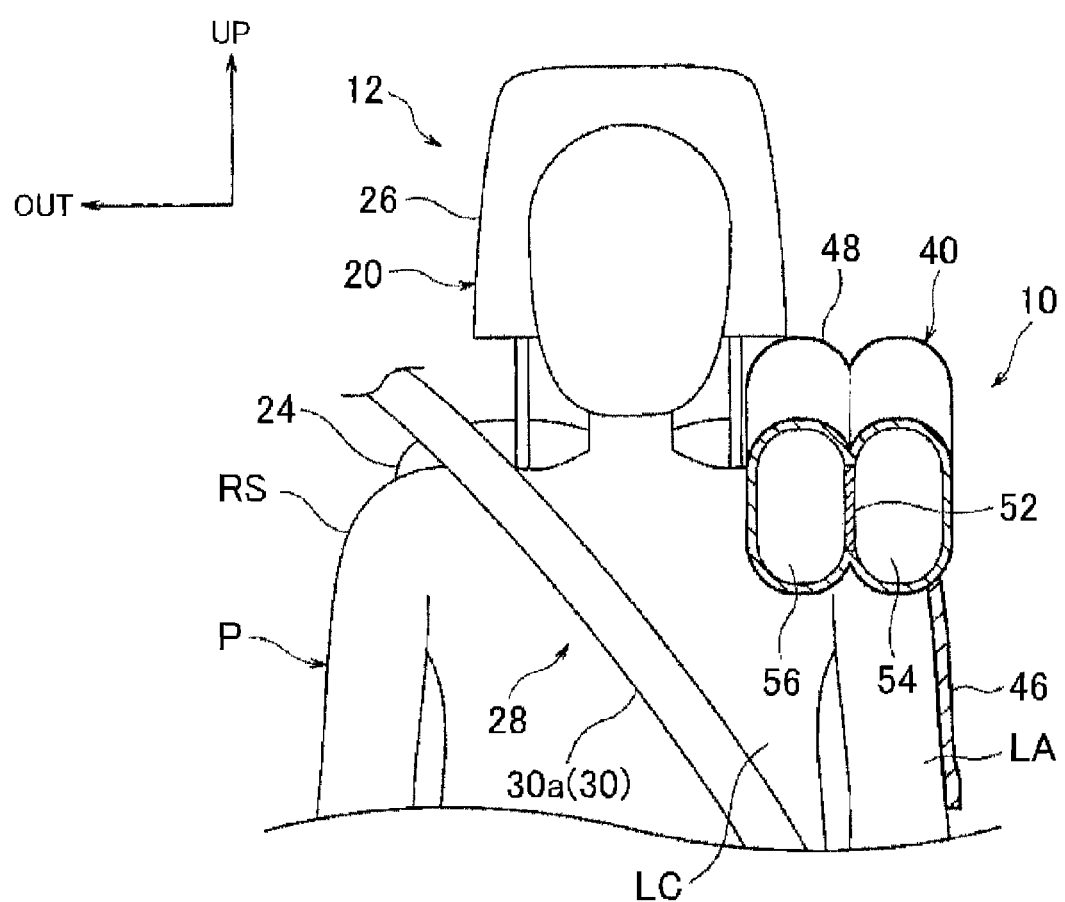
FIG. 7 is a front view of an upper portion of the vehicle seat according to the first example embodiment of the invention, showing a cross-section taken along line VII-VII in FIG. 2.

Meanwhile, the seat-mounted airbag apparatus 10 according to this example embodiment includes, as its main portions, a shoulder airbag 40 (a tube-like airbag), an inflator 42 (a gas generating device), and a membrane member 46 as an expanding member. The shoulder airbag 40 is normally housed inside a left side portion 24A (a side portion on the vehicle width direction inside; see FIG. 1) of the seatback 24, in a state folded up with the membrane member 46, as shown in FIGS. 4 and 5.

This shoulder airbag 40 inflates and deploys toward the vehicle front side of the left side portion 24A by the pressure of gas generated by the inflator 42. When the shoulder airbag 40 inflates and deploys, a pad and cover arranged on the left side portion 24A tear from the expansion pressure of the shoulder airbag 40. The structure of the shoulder airbag 40 will be described in detail below. Unless otherwise specified, the front, rear, up, and down directions of the shoulder airbag 40 described in the description below indicate directions when the shoulder airbag 40 is in an inflated and deployed state, and match the front, rear, up, and down directions of the seatback 24.

The shoulder airbag 40 includes a bag body 48 formed in a long, generally circular arc bag shape. The bag body 48 is formed by sewing a plurality of pieces of base fabric formed cut out of nylon or polyester cloth material, for example. These plurality of pieces of base fabric are a pair of base fabric pieces cut out in a generally circular arc shape (i.e., a general L-shape), and a pair of base fabric pieces cut out in long strips. The bag body 48 that is formed by these pieces of base fabric being sewn together is curved in a generally circular arc shape on the whole. One longitudinal end portion of this bag body 48 (i.e., one end portion in the direction of curvature; hereinafter referred to as "rear end portion") is fixed by a fixing implement, not shown, to a left side portion of an upper end portion of a seatback frame 50 (see FIGS. 3 and 4) that is a frame member of the seatback 24.

A tether 52 (partition cloth) as a partitioning portion is provided inside the bag body 48. This tether 52 is formed by the same kind of cloth material that the bag body 48 is made out of, cut into a generally circular arc shape, and extends in the longitudinal direction of the shoulder airbag 40 at the vehicle width direction center portion of the shoulder airbag 40. This tether 52 is sewn to an inside surface of the shoulder airbag 40, such that the inside of the shoulder airbag 40 is partitioned into a left chamber 54 and a right chamber 56 by this tether 52.

These left and right chambers 54 and 56 are communicated together via a rear end communication hole 58 provided in a rear end portion of the bag body 48. Also, an opening for inserting the inflator is formed in the rear end portion of the bag body 48. A gas ejection portion 42A provided on an upper end portion of the inflator 42 is inserted into a rear end portion of the left chamber 54 via this opening.

The inflator 42 is a so-called cylinder type inflator and is formed in a circular cylindrical shape. This inflator 42 is arranged on the vehicle width direction inside of the seatback frame 50, with an axial direction thereof in a height direction of the seatback 24. A pair of upper and lower stud bolts 60 (see FIG. 5) protrudes toward the seat width direction inside (i.e., the vehicle width direction outside) from an outer peripheral portion of this inflator 42. These stud bolts 60 pass through a left side frame portion 50A that is a side portion on the vehicle width direction inside of the seatback frame 50, and nuts 62 are screwed on to the tip end sides of the stud bolts 60. As a result, the inflator 42 is fastened (so-called "tightened from the side") to the left side frame portion 50A.

Meanwhile, the membrane member 46 is formed by cloth material or sheet-like material cut out in a general fan shape (a general rhombus shape). This membrane member 46 is able to bend but does not easily stretch (i.e., it has a high tensile strength). A generally circular arc shaped edge portion of this membrane member 46 is set to the same length as the length of the bag body 48, and this circular arc shaped edge portion is joined to the left end portion of the bag body 48 by means such as sewing.

Also, with this membrane member 46, an edge portion (a rear end portion) that is positioned on the side opposite the other longitudinal end side of the bag body 48 (i.e., the other end side in the direction of curvature; hereinafter referred to as the front portion) is sandwiched between the inflator 42 and the left side frame portion 50A. The upper and lower stud bolts 60 of the inflator 42 pass through the rear end portion of this membrane member 46, and the rear end portion of this membrane member 46 is fixed to the left side frame portion 50A by the inflator 42. Also, a portion of the rear end portion of this membrane member 46 that is lower than the inflator 42 is fixed to the left side frame portion 50A by a fixing implement, not shown. As a result, the membrane member 46 extends between the bag body 48 and the left side frame portion 50A.

This membrane member 46 is rolled up or folded together with the shoulder airbag 40, as shown in FIG. 5, and housed inside a left side portion 24A of the seatback 24 in a state integrated with the shoulder airbag 40 and the inflator 42.

An ECU 64 (i.e., a controller) mounted in the vehicle is electrically connected to the inflator 42. A collision detecting portion 66 that includes a longitudinal acceleration sensor that detects acceleration in the longitudinal direction of the vehicle, and a lateral acceleration sensor that detects acceleration in a lateral direction of the vehicle, is electrically connected to this ECU 64. The ECU 64 and the collision detecting portion 66 are structure members of the seat-mounted airbag apparatus 10.

The ECU 64 activates the inflator of the front passenger airbag apparatus 36 and the inflator 42 of the seat-mounted airbag apparatus 10 when a frontal collision of the vehicle is detected based on a signal from the collision detecting portion 66. This frontal collision includes not only a full-lap frontal collision (a symmetrical collision), but also an asymmetrical collision such as an offset collision, an oblique collision, and a small overlap collision.

Also, the ECU 64 activates the inflator 42 of the seat-mounted airbag apparatus 10 when a side collision of the vehicle is detected based on a signal from the collision detecting portion 66. More specifically, the seat-mounted airbag apparatus 10 is mounted in the vehicle seat 12 that is the front passenger seat of a left-hand drive vehicle, so the inflator 42 is activated when the ECU 64 detects that another vehicle, for example, has collided with a side portion in the vehicle seat on the driver's side (i.e., the left side portion), not shown.

A pre-crash sensor capable of anticipating (predicting) at least one of a frontal collision or a side collision is connected to the ECU 64. In this case, the inflators may be configured to activate appropriately when it is detected that a frontal collision or a side collision is unavoidable. Also, the structure of peripheral members related to the activation control of the seat-mounted airbag apparatus 10 may be modified as appropriate.

When the inflator 42 is activated, gas is ejected into the shoulder airbag 40 from the gas ejection portion 42A of the inflator 42. The ejected gas is distributed to the left and right chambers 54 and 56, as shown by arrows G in FIG. 6. As a result, the shoulder airbag 40 inflates and deploys toward the vehicle front side of the left side portion 24A of the seatback 24. The winding direction of the rolling-up or folding is set such that, when the shoulder airbag 40 and the membrane member 46 unroll and unfold as the shoulder airbag 40 inflates and deploys, the shoulder airbag 40 and the membrane member 46 temporarily deploy toward the vehicle front side and the seat width direction outside (i.e., the vehicle width direction inside; see arrow IN in FIG. 5). In the example shown in FIG. 5, the folded up shoulder airbag 40 and the membrane member 46 are arranged on the vehicle rear side of the inflator 42. Therefore, a restricting member that inhibits the shoulder airbag 40 from deploying toward the vehicle rear side is preferably provided. Also, the folded up shoulder airbag 40 and membrane member 46 may also be arranged on the vehicle front side of the inflator 42.

When the shoulder airbag 40 is in an inflated and deployed state, one end side (a rear portion) in the longitudinal direction of the shoulder airbag 40 extends toward the vehicle front from an upper end portion of the left side portion 24A of the seatback 24, and is arranged next to (on the vehicle width direction inside) the neck of the occupant P. Also, a front portion of the shoulder airbag 40 extends downward at an angle toward the front of the vehicle. The other end portion (a front end portion) in the longitudinal direction of the shoulder airbag 40 is arranged at the same height as the abdominal region of the occupant P, and opposes a left shoulder LS (the shoulder on the vehicle width direction inside; the inside shoulder), a left upper arm LA, and a left chest region LC of the occupant P from the front.

Further, when the shoulder airbag 40 is in an inflated and deployed state, the membrane member 46 extends in the vehicle longitudinal direction between the shoulder airbag 40 and the left side frame portion 50A. This membrane member 46 extends from the left side frame portion 50A toward the vehicle front, and opposes (abuts against, in this case) the left shoulder LS (shoulder on either the left or the right), the left upper arm LA, and the left chest region LC from the side (i.e., the vehicle width direction inside). Also, as a result of the membrane member 46 being expanded between the shoulder airbag 40 and the left side frame portion 50A, the front portion of the shoulder airbag 40 is retained in a position opposing the left shoulder LS, the left upper arm LA, and the left chest region LC of the occupant P from the front. In this expanded state, the lower end of the membrane member 46 is arranged at the same height as the abdominal region of the occupant P.

When the shoulder airbag 40 is inflated and deployed while the occupant P is seated in the seat main body 20 in a proper seating posture, a predetermined gap 68 (see FIG. 2) is ensured between the front portion of the shoulder airbag 40 and the left shoulder LS of the occupant P. A dimension L in the vehicle longitudinal direction of this gap 68 is preferably set larger than the distance that the left shoulder IS will move from inertia toward the vehicle front side between the time that a frontal collision occurs and the time that the shoulder airbag 40 has finished inflating and deploying. As a result, the shoulder airbag 40 that is in the midst of being inflated and deployed will not inadvertently interfere with the left shoulder LS.

Also, in this example embodiment, when the frontal collision occurs, the inflator of the front passenger airbag apparatus 36 activates together with the inflator 42 of the seat-mounted airbag apparatus 10, such that the front passenger airbag 38 inflates and deploys. At this time, the shoulder airbag 40 is configured (i.e., set) to finish inflating and deploying before the front passenger airbag 38 finishes inflating and deploying. As a result, the shoulder airbag 40 that is in the midst of being inflated and deployed will not inadvertently interfere with the front passenger airbag 38.

However, the shape of the shoulder airbag 40 is set such that, when the shoulder airbag 40 and the front passenger airbag 38 have finished inflating and deploying, the front portion of the shoulder airbag 40 contacts the rear surface of the front passenger airbag 38.

Further, when the bag body 48 of the shoulder airbag 40 is in an inflated and deployed state, inflation of the bag body 48 in the thickness direction thereof is inhibited by the tether 52 provided inside the bag body 48 expanding in the thickness direction of the bag body 48 (see arrow t in FIG. 6). Therefore, the bag body 48 inflates and deploys in a planar shape that does not have a circular cross-section, and the width dimension (see arrow w in FIG. 6) of the bag body 48 in the seat width direction increases.

(Operation and Effects)

Next, the operation and effects of this first example embodiment will be described.

In this first example embodiment, when the ECU 64 detects a frontal collision in response to a signal from the collision detecting portion 66, the inflator of the front passenger airbag apparatus 36 and the inflator 42 of the seat-mounted airbag apparatus 10 are activated. Consequently, the front passenger airbag 38 inflates and deploys from the instrument panel 16 in front of the vehicle seat 12, and the shoulder airbag 40 inflates and deploys toward the vehicle front side from the left side portion 24A of the seatback 24.

When this shoulder airbag 40 inflates and deploys, the membrane member 46 expands between the shoulder airbag 40 and the left side frame portion 50A of the seatback frame 50. This membrane member 46 opposes the left shoulder LS of the occupant P from the vehicle width direction inside, and holds the front portion of the shoulder airbag 40 in a position opposing the left shoulder LS from the front. As a result, the left shoulder LS is able to be restrained from the side and the front by the membrane member 46 and the shoulder airbag 40.

Moreover, in this example embodiment, a right shoulder RS of the occupant P (i.e., a shoulder on the vehicle width direction outside where the buckle of the three-point seatbelt apparatus is not provided) is restrained by the seatbelt 30, while the shoulder airbag 40 is inflated and deployed and the membrane member 46 is expanded when the vehicle is involved in a frontal collision, such that the left shoulder LS (i.e., the shoulder on the vehicle width direction inside where the buckle is provided) is restrained from the side and the front by the membrane member 46 and the shoulder airbag 40. In this way, both shoulders of the occupant P are able to be restrained, so behavior of the occupant P when a frontal collision occurs is able to be effectively suppressed.

For example, if the manner of the frontal collision is a symmetrical collision (i.e., a full frontal collision), the upper body of the occupant P is able to be inhibited from twisting by both the left and right shoulders LS and RS of the occupant P being restrained from the front. Moreover, a load placed on the upper body of the occupant P is dispersed to both the left and right sides of the upper body, so the amount of deflection of the chest of the occupant P is able to be reduced.

Further, if the manner of the frontal collision is an asymmetric collision such as an oblique collision, for example, the amount of longitudinal and lateral movement of the left shoulder LS that is restrained by the membrane member 46 and the shoulder airbag 40 is reduced, so the amount of longitudinal and lateral movement of the right shoulder RS is also reduced. As a result, the right shoulder RS is able to be kept from inadvertently slipping out of the shoulder belt 30a of the seatbelt 30. Also, the head of the occupant P is able to be inhibited from falling sideways by the shoulder airbag 40, so the head and neck are able to be better protected. Furthermore, just as with a symmetrical collision, the upper body of the occupant P is able to be inhibited from twisting, and the amount of deflection of the chest of the occupant P is able to be reduced. The effects when this asymmetric collision occurs will be described in detail using a comparative example shown in FIGS. 8A and 8B.

Figure 8A:
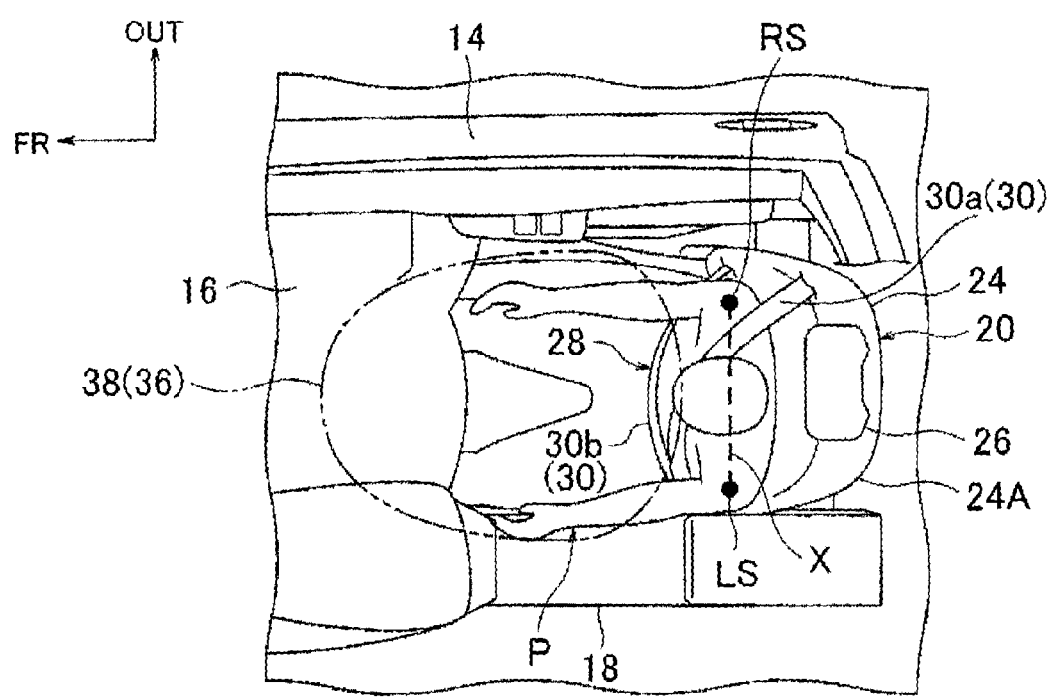
FIG. 8A is a plan view showing an initial stage of a collision when a vehicle according to a comparative example is involved in an oblique collision.
Figure 8B:
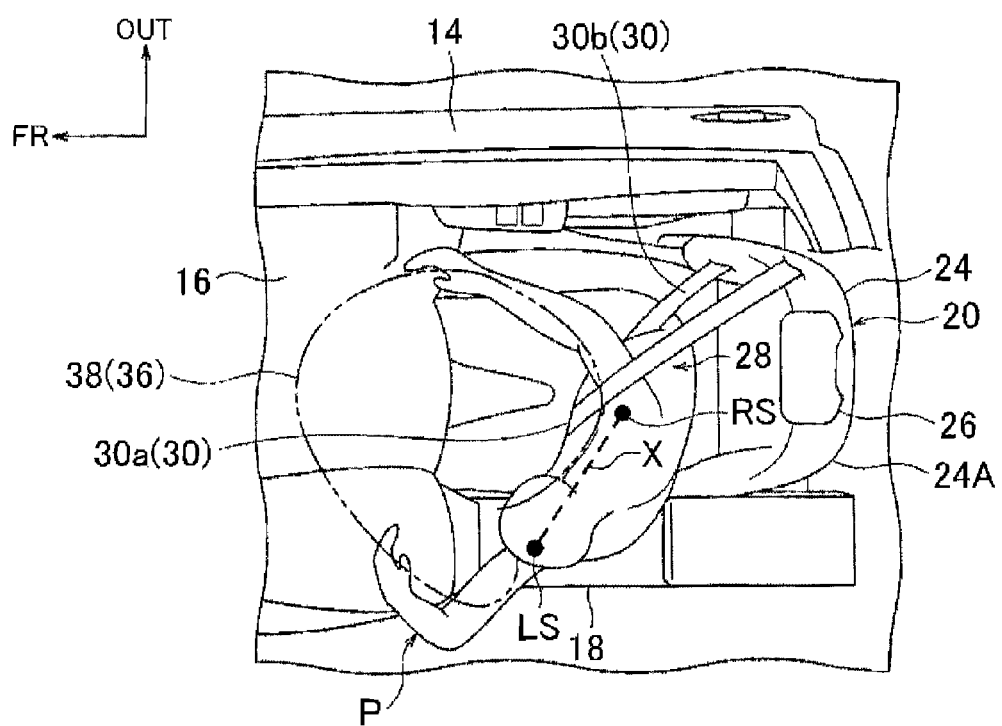
FIG. 8B is a plan view showing a later stage of the collision after the point shown in FIG. 8A, in the comparative example.

This comparative example is structured similar to the example embodiment, except for that the seat-mounted airbag apparatus 10 is not provided. Also, FIGS. 8A and 8B show a situation in which the driver's side of the vehicle according to the comparative example is involved in an oblique collision. When the driver's side is involved in an oblique collision, the occupant P seated in the front passenger seat moves from inertia toward the vehicle front side and at an angle toward the vehicle width direction inside. As a result, the right shoulder RS of the occupant P may slip out of the shoulder belt 30a, and the upper body of the occupant P may twist greatly, as shown in FIG. 8B. In FIGS. 8A and SB, as well as FIGS. 9A and 9B that will be described later, the dotted line denoted by reference character "X" is a line segment that connects the center of the left shoulder LS to the center of the right shoulder RS.

Figure 9A:
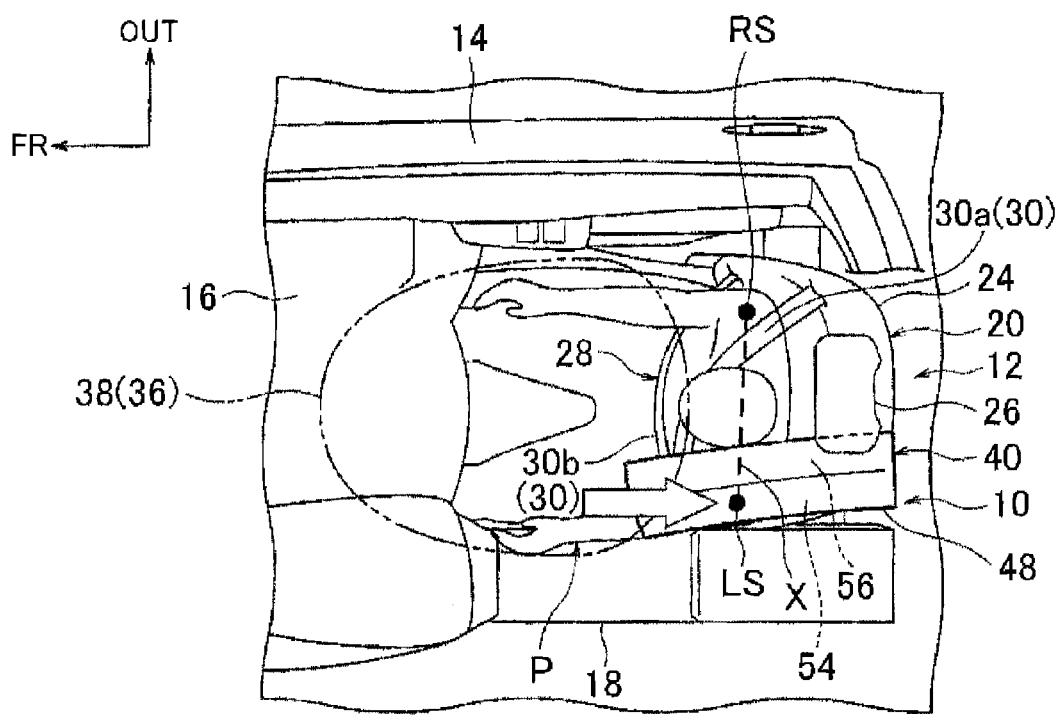
FIG. 9A is a plan view showing an initial stage of a collision when the vehicle according to the example embodiment is involved in an oblique collision.

On the other hand, in this example embodiment, as shown in FIGS. 9A and 9B, even if the occupant P tries to move by inertia toward the vehicle front side and at an angle toward the vehicle width direction inside by the impact of the oblique collision, the left shoulder LS will be restrained from the vehicle front side and the vehicle width direction inside by the shoulder airbag 40. Therefore, not only is the amount that the left shoulder LS moves toward the vehicle front side and the vehicle width direction inside able to be reduced, but also the amount that the right shoulder RS moves toward the vehicle front side and the vehicle width direction inside is able to be reduced. As a result, the right shoulder RS is able to be kept from coming out of the shoulder belt 30a, and the twisting of the upper body of the occupant P is able to be suppressed.

Also, in this example embodiment, when gas is supplied into the shoulder airbag 40 and the shoulder airbag 40 consequently inflates and deploys, the shoulder airbag 40 and the membrane member 46 temporarily deploy toward the front side and the seat width direction outside. Therefore, the shoulder airbag 40 that is in the midst of being inflated and deployed will not inadvertently interfere with the left shoulder LS of the occupant P. Moreover, the shoulder airbag 40 that has temporarily deployed toward the front side and the seat width outside will wrap around the front of the left shoulder LS from the action of the membrane member 46, so the shoulder airbag 40 is able to be better deployed in front of the left shoulder LS.

Further, in this example embodiment, the left and right chambers 54 and 56 are provided lined up in the vehicle width direction when the shoulder airbag 40 is inflated and deployed, so they are able to restrain the left shoulder LS over a wide area. As a result, occupant restraint performance is able to be improved. Moreover, the shoulder airbag 40 inflates and deploys in a wide sectional flat shape in the seat width direction, so even if the shoulder airbag 40 inflates and deploys in a circular sectional shape, the volume of the shoulder airbag 40 can be made small while ensuring the contact area with the left shoulder LS. As a result, the shoulder airbag 40 is able to finish inflating and deploying quickly.

Also, in this example embodiment, when there is a frontal collision, both the front passenger airbag 38 and the shoulder airbag 40 inflate and deploy, and the front portion of the shoulder airbag 40 contacts the rear surface of the front passenger airbag 38. Consequently, the left shoulder LS of the occupant P that moves from inertia toward the vehicle front side is supported from the front by the front passenger airbag 38 via the front portion of the shoulder airbag 40. As a result, forward movement of the left shoulder LS is able to be effectively suppressed.

Next, other example embodiments of the invention will be described. Structure and operation that are basically the same as that of the first example embodiment described above will be denoted by the same reference characters used in the first example embodiment, and descriptions thereof will be omitted.

Second Example Embodiment

Figure 10B:
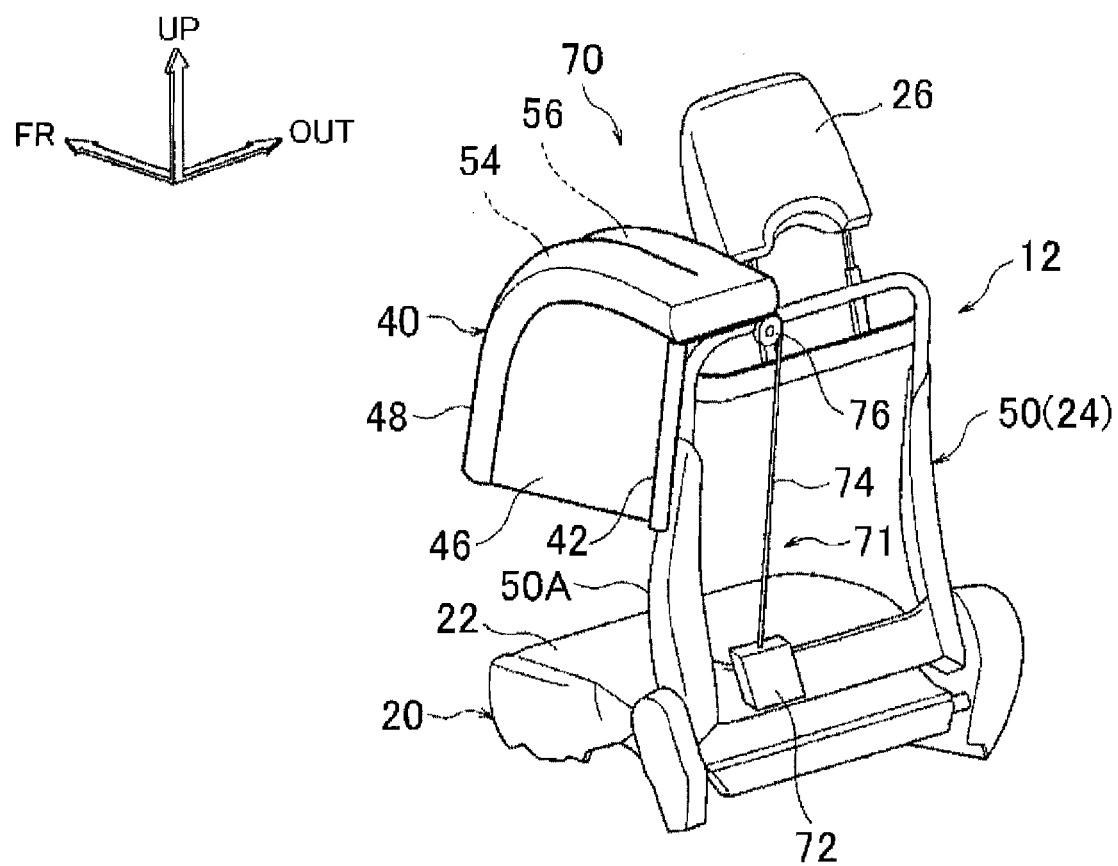
FIG. 10B is a perspective view showing a state in which an inflated and deployed shoulder airbag is pulled down by a retracting device, in the vehicle seat according to the second example embodiment of the invention.

FIGS. 10A and 10B are perspective views from the same direction as FIG. 4, of a second example embodiment of the invention. The structure of a seat-mounted airbag apparatus 70 in this example embodiment differs from the seat-mounted airbag apparatus 10 according to the first example embodiment described above. This seat-mounted airbag apparatus 70 is configured such that the shoulder airbag 40 inflates and deploys farther to the seat width direction outside than it does in the first example embodiment, and the inflated and deployed shoulder airbag 40 is pulled down toward the vehicle width direction outside (i.e., the seat width direction inside) by a retracting device 71.

The retracting device 71 is configured similar to a so-called pre-tensioner, and a micro gas generator is housed inside of a main body portion 72 that is fixed to a lower end portion of the seatback frame 50. This retracting device 71 is configured to retract one end portion of a wire 74 (a long flexible member) by the pressure of gas generated by the micro gas generator. FIG. 10A is a view of the state of before the wire 74 is retracted, and FIG. 10B is a view of the state after the wire 74 is retracted.

The other end side of the wire 74 is wound around a pulley 76 that is attached to an upper end portion of the seatback frame 50. The other end portion of the wire 74 is fixed to a vehicle width direction inside end portion of the upper end portion of the seatback frame 50. A rear end portion (i.e., one end portion in the longitudinal direction) of the shoulder airbag 40 is fixed to the other end side of the wire 74 between the fixed portion and the pulley 76. Thus, the rear end portion of the shoulder airbag 40 is fixed to the seatback frame 50 via the wire 74.

The retracting device 71 described above is electrically connected to the ECU 64. The ECU 64 is configured to activate the retracting device 71 after making the shoulder airbag 40 inflate and deploy, by activating the inflator 42 of the seat-mounted airbag apparatus 70. The shoulder airbag 40 that is inflated and deployed before the retracting device 71 is activated inflates and deploys such that a thickness direction thereof (see arrow t in FIG. 6) runs along the vehicle width direction, as shown in FIG. 10A. The membrane member 46 expands by this shoulder airbag 40 being inflated and deployed. This membrane member 46 opposes the left shoulder of the occupant P from the vehicle width direction inside, and keeps the front portion of the shoulder airbag 40 in a state extending toward the vehicle lower side (i.e., the state shown in FIG. 10A).

When the shoulder airbag 40 finishes inflating and deploying in this way, the retracting device 71 is activated such that the rear end portion of the shoulder airbag 40 is pulled down toward the vehicle width direction outside (i.e., the seat width direction inside) via the wire 74. Accordingly, the entire shoulder airbag 40 is pulled down toward the vehicle width direction outside, such that the front portion of the shoulder airbag 40 opposes the left shoulder LS of the occupant P from the front. The other structure in this example embodiment is the same as it is in the first example embodiment described above.

In this example embodiment, the inflated and deployed shoulder airbag 40 is pulled down toward the vehicle width direction outside so that it opposes the left shoulder LS. Therefore, the shoulder airbag 40 is able to be made to inflate and deploy farther to the vehicle width direction inside than the left shoulder LS. Accordingly, it is possible to prevent or effectively inhibit the shoulder airbag 40 from inadvertently interfering with the left shoulder LS, so the shoulder airbag 40 can inflate and deploy smoothly. Also, the shoulder airbag 40 and the seatback frame 50 are connected by the wire 74, and the shoulder airbag 40 is kept in a retracted state (i.e., under tension), so forward movement of the left shoulder LS of the occupant P is able to be effectively suppressed.

Third Example Embodiment

Figure 11:
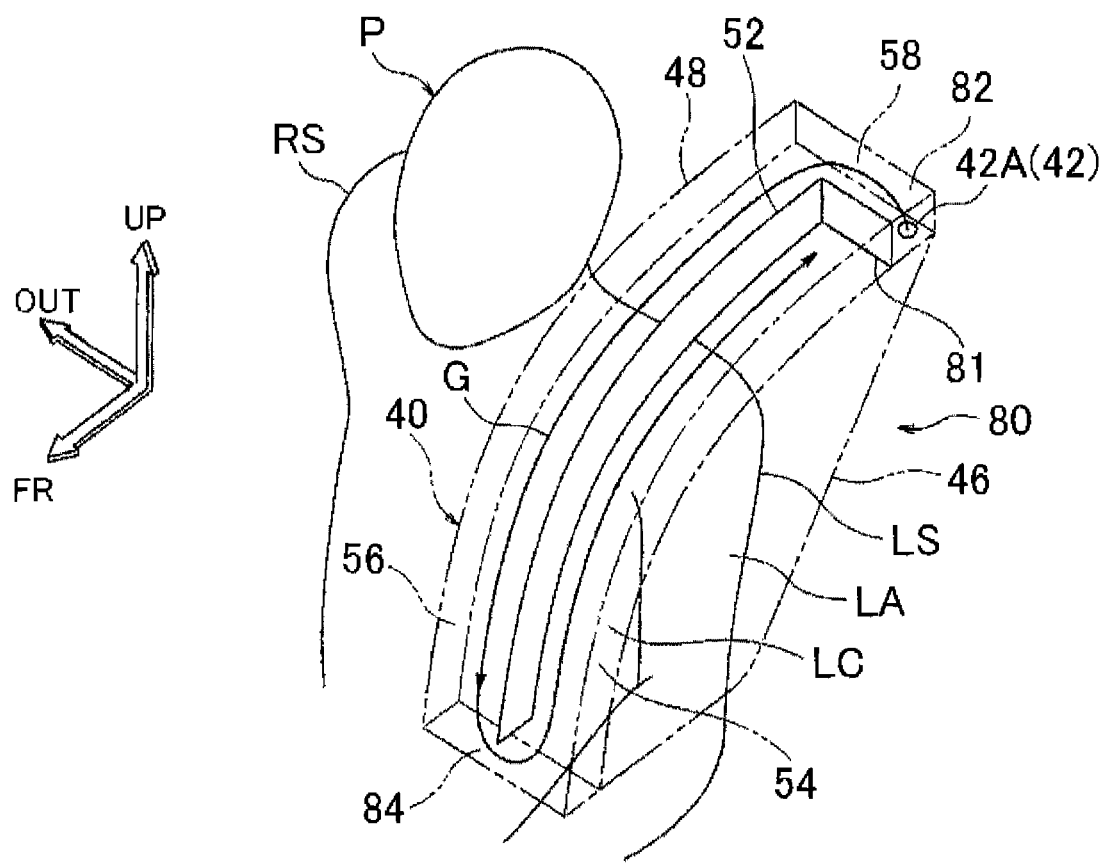
FIG. 11 is a perspective view illustrating the flow of gas supplied into a shoulder airbag, in a seat-mounted airbag apparatus according to a third example embodiment of the invention.

FIG. 11 is a perspective view similar to FIG. 6, of the structure of the main parts of a seat-mounted airbag apparatus 80 according to a third example embodiment of the invention. In this example embodiment, a partitioning piece 81 extends out from a rear end portion of the tether 52. This partitioning piece 81 extends out so as to extend toward the vehicle width direction inside when the shoulder airbag 40 is in the inflated and deployed state. The left chamber 54 is partitioned off from a gas inflow chamber 82 that houses the gas ejection portion 42A of the inflator 42 by this partitioning piece 81. The gas inflow chamber 82 is communicated with the right chamber 56. Also, in this example embodiment, a front end communication hole 84 is formed between the front end portion of the tether 52 and the front end portion of the shoulder airbag 40. The left and right chambers 54 and 56 are communicated together via this front end communication hole 84. The other structure in this example embodiment is the same as it is in the first example embodiment described above.

In this example embodiment, gas that is ejected into the gas inflow chamber 82 from the gas ejection portion 42A of the inflator 42 and flows into the right chamber 56 is supplied to the left chamber 54 through the front end communication hole 84 (see arrow G in FIG. 11). Accordingly, the right chamber 56 that occupies half of the volume of the shoulder airbag 40 inflates and deploys before the left chamber 54 does, so the shoulder airbag 40 is able to finish deploying quickly all the way up to the front end (the tip end). As a result, the occupant restraint performance is able to be further improved. Also, the right chamber 56 inflates and deploys first toward the seat width direction inside of the left chamber 54, so the shoulder airbag 40 is able to more easily inflate and deploy toward the seat width direction inside. As a result, the front portion of the shoulder airbag 40 is able to better oppose the left shoulder LS from the front. An example in which gas that first flows into the right chamber 56 is supplied to the left chamber through the front end communication hole 84 is described, but a configuration in which gas first flows into the left chamber and is then supplied to the right chamber may also be employed. This example also enables the shoulder airbag 40 to finish deploying quickly all the way up to the front end (the tip end).

Fourth Example Embodiment

Figure 12:
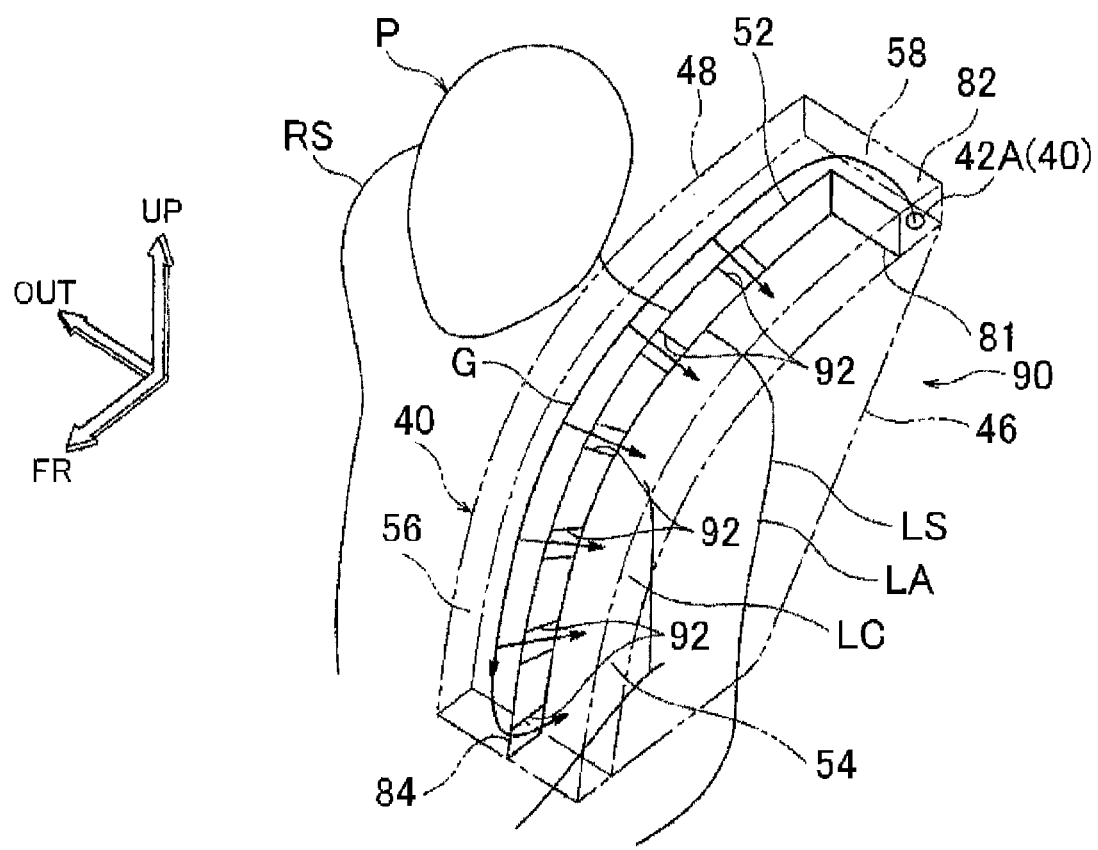
FIG. 12 is a perspective view illustrating the flow of gas supplied into a shoulder airbag, in a seat-mounted airbag apparatus according to a fourth example embodiment of the invention.

FIG. 12 is a perspective view similar to FIG. 6, of the structure of the main parts of a seat-mounted airbag apparatus 90 according to a fourth example embodiment of the invention. This example embodiment includes the partitioning piece 81 and the front end communication hole 84, similar to the third example embodiment described above. In addition, a plurality of intermediate communication holes 92 are formed lined up in the longitudinal direction of the tether 52, in a longitudinal intermediate portion of the tether 52. In this example embodiment, gas that flows into the right chamber 56 is supplied to the left chamber 54 from not only the front end communication hole 84, but also the plurality of intermediate communication holes 92, as shown by arrows G in FIG. 12. As a result, the left chamber 54 is able to be inflated and deployed earlier than it is in the third example embodiment described above.

Fifth Example Embodiment

Figure 13:
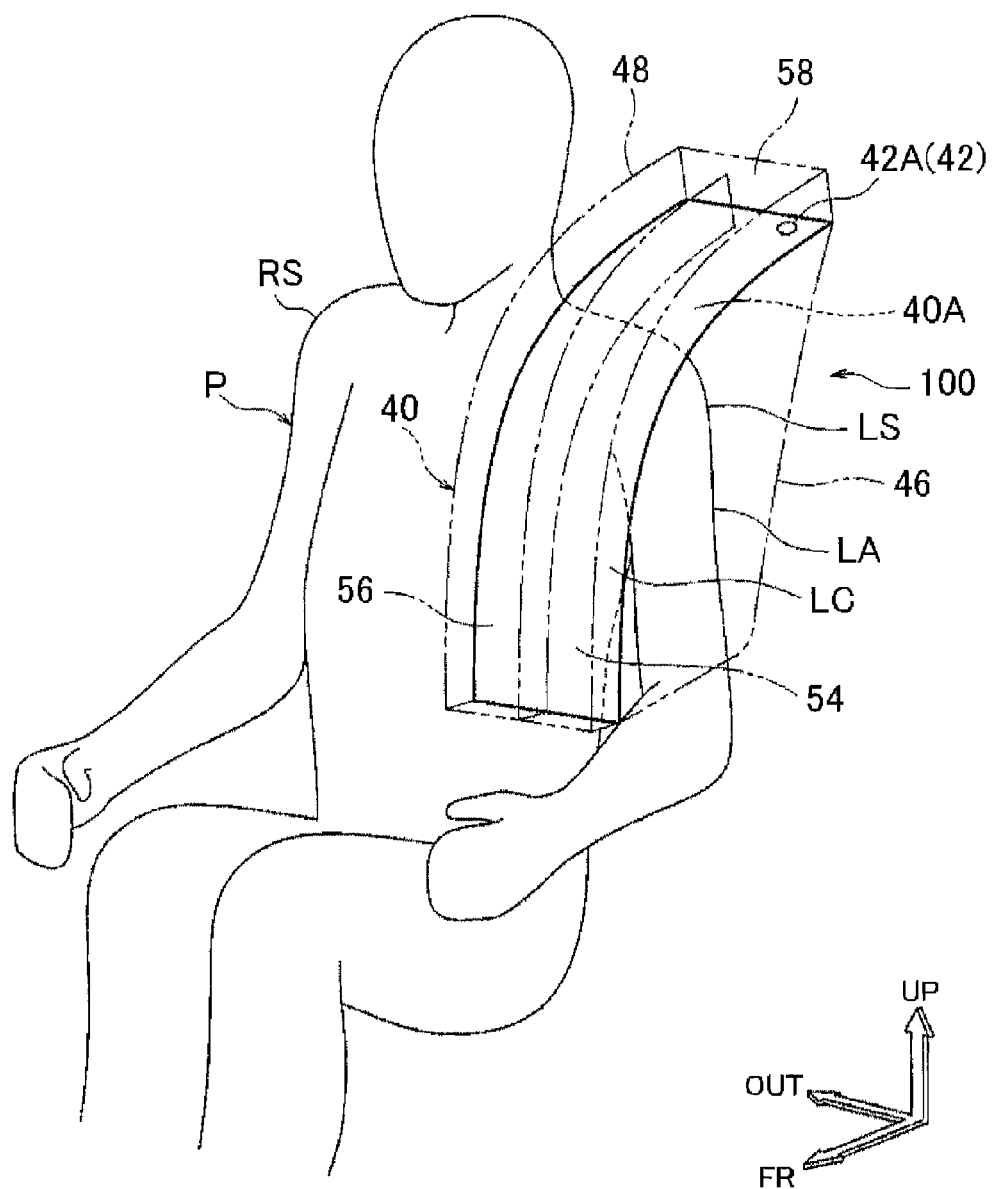
FIG. 13 is a perspective view showing a shoulder airbag of a seat-mounted airbag apparatus according to a fifth example embodiment of the invention, in an inflated and deployed state.

FIG. 13 is a perspective view of the shoulder airbag 40 that is a structure member of a seat-mounted airbag apparatus 100 according to a fifth example embodiment of the invention in an inflated and deployed state. In this example embodiment, a surface 40A of the shoulder airbag 40 that opposes the left shoulder LS when the shoulder airbag 40 is in the inflated and deployed state is coated with high friction material (such as silicon rubber) that increases the coefficient of friction of the surface 40A. As a result, when the left shoulder LS is restrained by the shoulder airbag 40, the left shoulder LS will not inadvertently slide against the shoulder airbag 40, thus making it possible to effectively inhibit the left shoulder LS from slipping off of the shoulder airbag 40.

Sixth Example Embodiment

Figure 14:
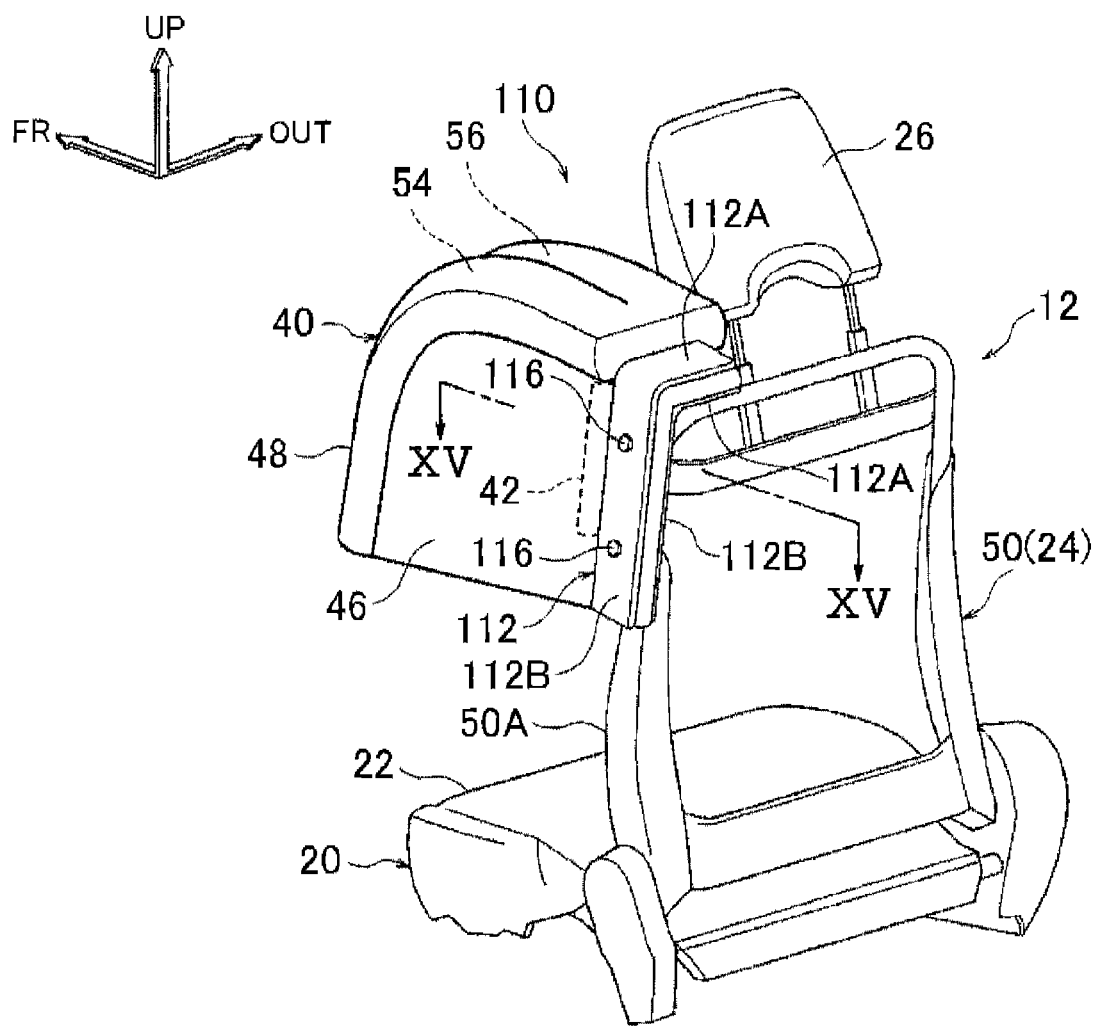
FIG. 14 is a perspective view of the structure of the main portions of a vehicle seat according to a sixth example embodiment of the invention, showing a shoulder airbag in an inflated and deployed state.

FIG. 14 is a perspective view of a sixth example embodiment of the invention, from the same direction as FIG. 4. With a seat-mounted airbag apparatus 110 according to this example embodiment, the rear end portion of the shoulder airbag 40 and the rear end portion of the membrane member 46 are fixed to the seatback frame 50 by a pair of brackets 112. The other points are the same as they are with the seat-mounted airbag apparatus 10 according to the first example embodiment described above.

The pair of brackets 112 are formed by bending plate material, and are formed in inverted L-shapes when viewed from the front side of the seatback 24. Each of the two brackets 112 has an upper portion 112A that extends along an upper end portion of the seatback frame 50, and a side portion 112B that extends toward the vehicle lower side along the vehicle width direction inside surface of the left side frame portion 50A from the seat width direction outside end portion of the upper portion 112A. These two brackets 112 are overlapping in the plate thickness direction.

Figure 15:
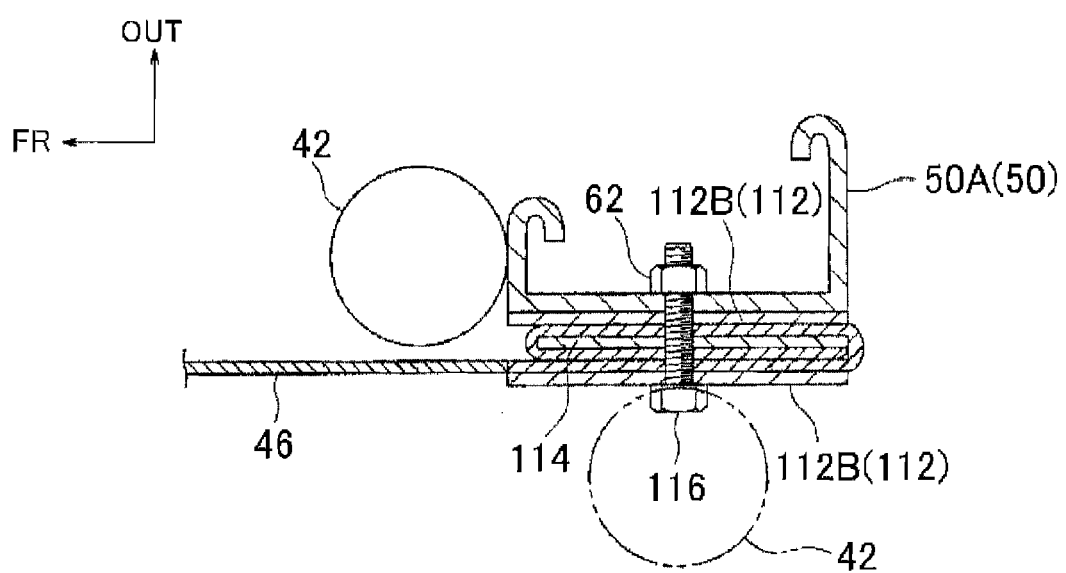
FIG. 15 is an enlarged sectional view of a cross-section taken along line XV-XV in FIG. 14.

As shown in FIG. 15, a rear end portion of the membrane member 46 that is wrapped around a metal plate 114 is sandwiched between the side portions 112B of the pair of brackets 112. A nut 62 is screwed onto a tip end portion of a bolt 116 that passes through the side portions 112B, the rear end portion of the membrane member 46, the metal plate 114, and the left side frame portion 50A. As a result, the rear end portion of the membrane member 46 is fixed to the left side frame portion 50A by the pair of brackets 112. Also, although not shown, a rear end portion of the shoulder airbag 40 that is wrapped around a metal plate is sandwiched between the upper portions 112A of the pair of brackets 112, and is fixed to an upper end portion of the seatback frame 50 by the same method as described above.

In this example embodiment, the inflator 42 is arranged in a position indicated by the solid line in FIG. 15, and the inflator 42 is fixed to the left side frame portion 50A by a stud bolt and nut, not shown, but the arrangement of the inflator 42 may be modified as appropriate. For example, the inflator 42 may be arranged in a position indicated by the alternate long and two short dashes line in FIG. 15. In this case, the stud bolt of the inflator 42 may be used instead of the bolt 116.

In this example embodiment, the shoulder airbag 40 and the membrane member 46 can be firmly fixed to the seatback frame 50 via the brackets 112 such as that described above. As a result, the fixing portion where the shoulder airbag 40 and the membrane member 46 are fixed to the seatback frame 50 will not be inadvertently fractured when the left shoulder LS of the occupant P that moves by inertia from the impact when a vehicle collision occurs is restrained by the shoulder airbag 40 and the membrane member 46.

Seventh Example Embodiment

Figure 16:
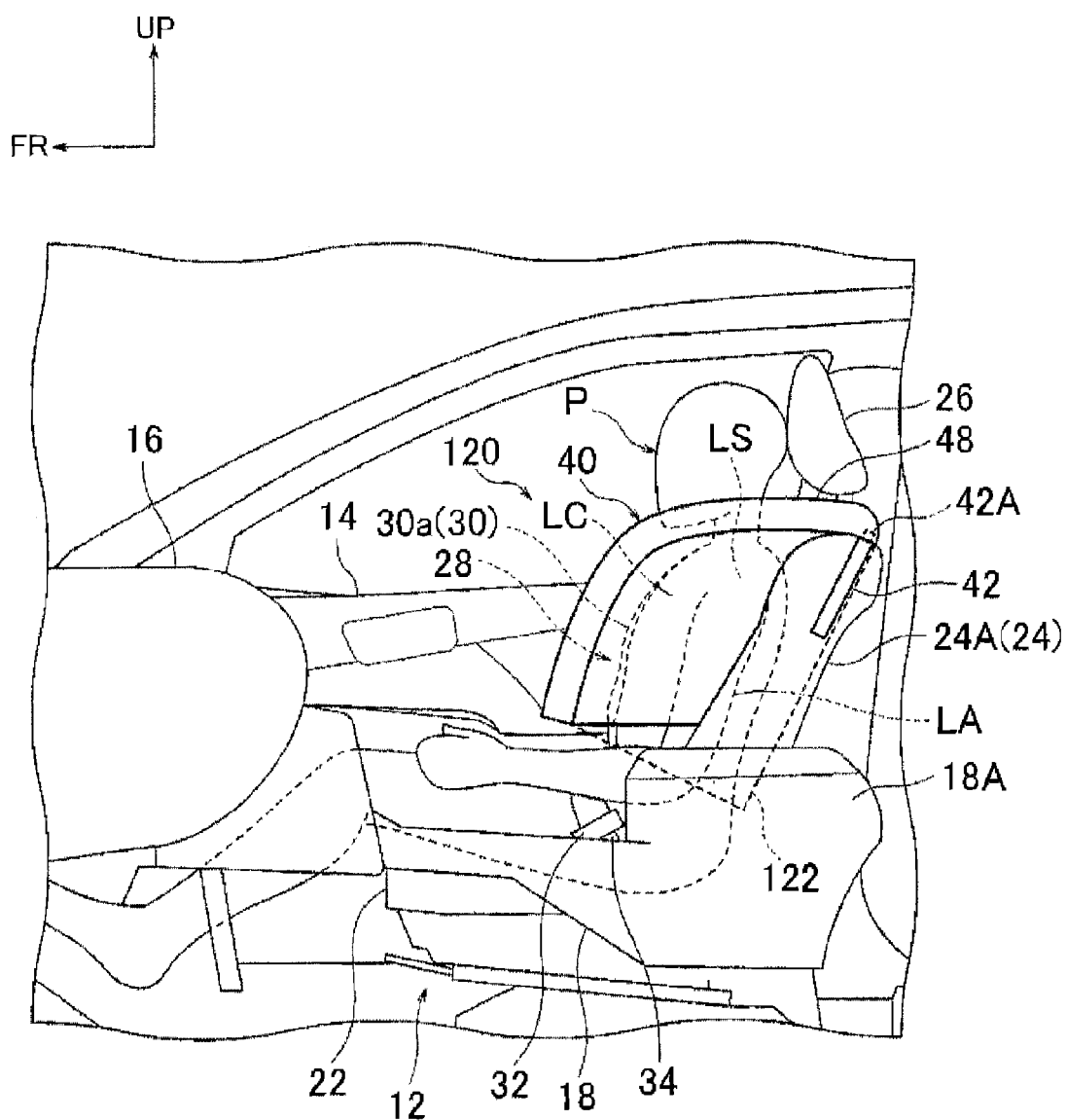
FIG. 16 is a side view of the structure of a tight side portion of a vehicle cabin front portion of a vehicle provided with a vehicle seat according to a seventh example embodiment of the invention, showing a shoulder airbag of a seat-mounted airbag apparatus in an inflated and deployed state.

FIG. 16 is a side view of the structure of a right side portion of the vehicle cabin front portion of a vehicle according to a seventh example embodiment of the invention. With a seat-mounted airbag apparatus 120 according to this example embodiment, a membrane member 122 (expanding member) is formed such that a lower end thereof inclines toward the vehicle rear side and the vehicle lower side, when the shoulder airbag 40 is in an inflated and deployed state, as shown in FIG. 16. As a result, the rear portion side of the lower end of the membrane member 122 is formed so as to be positioned lower than an upper surface of a console box 18A provided on a rear portion of a center console 18, in a vehicle side view.

In this example embodiment, the structure is as described above, so even if the manner of collision is such that the occupant P moves by inertia toward the vehicle width direction inside (such as a so-called far side collision or the like), the occupant P is supported by the console box 18A via the membrane member 122. As a result, movement of the occupant P by inertia is able to be effectively inhibited.

Supplemental Description of the Example Embodiments

In the example embodiments described above, the membrane member 46 and 122 as an expanding member is made of cloth material or sheet-like material, but the invention is not limited to this. The expanding member may also be made of net-like material.

Also, in the example embodiments described above, the vehicle seat 12 is a passenger seat of a left-hand drive vehicle and is arranged on the right side of a vehicle cabin front portion, but the invention is not limited to this. The vehicle seat may also be arranged on a left side of the vehicle cabin.

Also, in the example embodiments described above, the seat-mounted airbag apparatus 10, 70, 80, 90, 100, 110, and 120 is mounted on a side portion on the vehicle width direction inside of the seatback 24, but the invention is not limited to this. That is, when a buckle of a three-point seatbelt apparatus is provided on a vehicle width direction outside of the vehicle seat, the seat-mounted airbag apparatus may be mounted on a side portion on the vehicle width direction outside of the seatback. In this case, the occupant is able to be inhibited from moving toward the vehicle front side and the vehicle width direction outside.

In addition, the invention carried out with various modifications without departing from the scope thereof. Also, the scope of the invention is not limited by the example embodiments described above.

What is claimed is:

1. A seat-mounted airbag apparatus comprising:
    an inflator that is provided in a vehicle seat and generates gas by being activated;
    a shoulder airbag that is formed in a long bag shape and is housed in one side portion of a seatback of the vehicle seat, with one longitudinal end portion being fixed to a seatback frame, the shoulder airbag inflating and deploying by the gas being supplied there into, and extending from an upper end portion of the side portion toward a vehicle front side; and
    an expanding member that expands between the inflated and deployed shoulder airbag and the seatback frame, and that opposes one shoulder of a seated occupant from a side, and keeps the other longitudinal end portion of the shoulder airbag in a position opposing the one shoulder from the front.

2. The seat-mounted airbag apparatus according to claim 1, wherein
    a buckle of a three-point seatbelt apparatus is provided on a vehicle width direction inside of the vehicle seat; and
    the shoulder airbag and the expanding member are housed in a side portion on the vehicle width direction inside of the seatback.

3. The seat-mounted airbag apparatus according to claim 2, wherein
    the shoulder airbag is housed in a side portion of the seatback, rolled up or folded together with the expanding member, and a direction in which the shoulder airbag is rolled up or folded is set a direction in which the shoulder airbag temporarily deploys toward the vehicle front side and the vehicle width direction inside when gas is supplied into the shoulder airbag and the shoulder airbag and the expanding member unrolls up and unfolds.

4. The seat-mounted airbag apparatus according to claim 1, wherein
    a partitioning portion that divides the shoulder airbag into left and right chambers lined up in a vehicle width direction when the shoulder airbag is in an inflated and deployed state is provided in a longitudinal direction of a bag body inside the shoulder airbag.

5. The seat-mounted airbag apparatus according to claim 4, wherein
    the partitioning portion is a tether; and
    when the shoulder airbag is in the inflated and deployed state, the tether is configured to be expanded in a thickness direction of the shoulder airbag to suppress inflation of the shoulder airbag in the thickness direction.

6. The seat-mounted airbag apparatus according to claim 4, wherein
    the left and right chambers are communicated together by a front end communication hole provided in a front end portion of the shoulder airbag; and
    the gas that is supplied into one of the left and right chambers is supplied into the other chamber through the front end communication hole.

7. The seat-mounted airbag apparatus according to claim 6, wherein
    the one chamber is a chamber that is adjacent to the one shoulder.

8. The seat-mounted airbag apparatus according to claim 6, wherein
    the left and right chambers are communicated together at a plurality of intermediate communication holes provided in an intermediate portion between the front end portion and a rear end portion of the shoulder airbag.

9. The seat-mounted airbag apparatus according to claim 1, wherein
a surface of the shoulder airbag that opposes the shoulder when the shoulder airbag is in an inflated and, deployed state is coated with a high friction material that increases a coefficient of friction of the surface.

10. The seat-mounted airbag apparatus according to claim 1, further comprising:
a pair of brackets each having an upper portion that extends along an upper end portion of the seatback frame, and a side portion that extends toward a vehicle lower side along a side surface of the seatback frame from a seat width direction outside end portion of the upper portion, wherein
the shoulder airbag and the expanding member are fixed to the seatback frame via the pair of brackets in a state sandwiched between the pair of brackets.

11. The seat-mounted airbag apparatus according to claim 1, wherein
the shoulder airbag and the expanding member are housed in a side portion on a vehicle width direction inside of the seatback, and the expanding member is formed such that a lower end thereof is positioned lower than an upper surface of a console box in a vehicle side view, when the shoulder airbag is in an inflated and deployed state.

12. The seat-mounted airbag apparatus according to claim 1, wherein
the vehicle seat is a front seat of a vehicle; and
the shoulder airbag is formed such that the other longitudinal end portion of the shoulder airbag contacts a rear surface of a front seat airbag that is provided in front of the vehicle seat, when both the shoulder airbag and the front seat airbag are in inflated and deployed states.

13. The seat-mounted airbag apparatus according to claim 1, wherein
the vehicle seat is a front seat of a vehicle, and
the shoulder airbag is configured to finish inflating and deploying before a front seat airbag that is provided in front of the vehicle seat finishes inflating and deploying.

14. A seat-mounted airbag apparatus comprising:
an inflator that is provided in a vehicle seat and generates gas by being activated;
a shoulder airbag that is formed in a long bag shape and is housed in one side portion of a seatback of the vehicle seat, with one longitudinal end portion being fixed to a seatback frame, the shoulder airbag inflating and deploying by the gas being supplied there into, and extending from an upper end portion of the side portion toward a vehicle front side;
an expanding member that expands between the inflated and deployed shoulder airbag and the seatback frame, and that opposes one shoulder of a seated occupant from a side, and that holds the other longitudinal end portion of the shoulder airbag in a state extending toward a vehicle lower side; and
a retracting device that causes the other longitudinal end portion to oppose the one shoulder from a front, by pulling down the inflated and deployed shoulder airbag toward a seat width direction inside by driving force.

15. The seat-mounted airbag apparatus according to claim 10, wherein
the retracting device includes a main body portion that is fixed to the seatback frame and within which a micro gas generator is housed, and a wire that is connected at one end portion to the main body portion, and fixed at the other end portion to a rear end portion of the shoulder airbag, and the retracting device is configured to retract the one end portion of the wire by pressure of gas generated by the micro gas generator.

16. A vehicle seat comprising:
a seat main body having a seatback; and
the seat-mounted airbag apparatus according to claim 1 provided in the seatback.

* * * * *